United States Patent
Dang et al.

(10) Patent No.: US 11,877,113 B2
(45) Date of Patent: Jan. 16, 2024

(54) DISTRIBUTED MICROPHONE IN WIRELESS AUDIO SYSTEM

(71) Applicant: Hewlett-Packard Development Company, L.P., Spring, TX (US)

(72) Inventors: Xiao Hui Dang, Suzhou (CN); John S. Graham, Santa Cruz, CA (US); Scott Walsh, Foxham (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 160 days.

(21) Appl. No.: 17/530,298

(22) Filed: Nov. 18, 2021

(65) Prior Publication Data
US 2023/0134602 A1 May 4, 2023

(30) Foreign Application Priority Data
Nov. 1, 2021 (CN) .......................... 202111282614.X

(51) Int. Cl.
| | |
|---|---|
| *H04R 1/10* | (2006.01) |
| *H04R 3/12* | (2006.01) |
| *H04M 1/60* | (2006.01) |
| *H04W 4/80* | (2018.01) |

(52) U.S. Cl.
CPC ........ *H04R 1/1041* (2013.01); *H04M 1/6066* (2013.01); *H04R 3/12* (2013.01); *H04W 4/80* (2018.02); *H04M 2250/02* (2013.01); *H04R 2420/05* (2013.01); *H04R 2420/07* (2013.01)

(58) Field of Classification Search
CPC .... H04R 1/1041; H04R 3/12; H04R 2420/08; H04R 2420/07; H04R 2227/00; H04M 1/6066; H04M 2250/02; H04W 4/80
USPC ...................................................... 455/569.1
See application file for complete search history.

(56) References Cited

U.S. PATENT DOCUMENTS

| | | | |
|---|---|---|---|
| 9,271,068 B2 | 2/2016 | Singhal | |
| 9,508,335 B2 | 11/2016 | Benattar et al. | |
| 2006/0166718 A1 | 7/2006 | Seshadri et al. | |
| 2017/0064427 A1* | 3/2017 | Rich | ..................... H04R 1/1016 |
| 2021/0037582 A1* | 2/2021 | Kim | ..................... H04R 5/033 |

FOREIGN PATENT DOCUMENTS

| | | |
|---|---|---|
| EP | 3249944 A1 | 11/2017 |
| KR | 20160128412 A | 11/2016 |

* cited by examiner

*Primary Examiner* — Eugene Yun
(74) *Attorney, Agent, or Firm* — Quarles & Brady LLP

(57) ABSTRACT

A microphone device generates a transmit audio stream via at least one microphone on the microphone device. The microphone device transmits the transmit audio stream to the computing device via a first wireless connection and ignores a receive audio stream received from the computing device via the first wireless connection. The speaker device obtains a set of connection parameters for the first wireless connection between the microphone device and the computing device, intercepts the receive audio stream transmitted using the first wireless connection from the computing device to the microphone device, and plays the receive audio stream on a speaker of the speaker device.

20 Claims, 5 Drawing Sheets

DISTRIBUTED MICROPHONE IN WIRELESS AUDIO SYSTEM

CROSS REFERENCE TO RELATED APPLICATIONS

This application claims benefit under 35 U.S.C. § 119(a) to Chinese Application Serial Number 202111282614.X filed on Nov. 1, 2021, which is incorporated by reference herein in its entirety.

BACKGROUND

Wireless audio input and output audio devices, such as conferencing systems, headphones, and earbuds, have integrated speaker and microphones in the same physical device. The audio device both detects audio input from the user and plays audio output to the user. The wireless audio I/O device communicates with a computing system by transmitting and receiving audio via the wireless connection with the computing system. For example, if a user has a phone call, the user may use earbuds with an integrated microphone to transmit and receive audio to the user's mobile phone on the phone call.

SUMMARY

In general, in one aspect, one or more embodiments relate to a method for distributed microphone in a wireless audio system. The method includes a microphone device establishing, by imitating a headset device, a first wireless connection with a computing device to create a set of connection parameters and sharing the set of connection parameters with a speaker device via a second wireless connection. The microphone device further generates a transmit audio stream via at least one microphone on the microphone device. The microphone device transmits the transmit audio stream to the computing device via the first wireless connection and ignores the receive audio stream received from the computing device via the first wireless connection.

In general, in one aspect, one or more embodiments relate to a method for distributed microphone in a wireless audio system. The speaker device obtains a set of connection parameters for a first wireless connection between the microphone device and a computing device, and intercepts, using the set of connection parameters, a receive audio stream transmitted using the first wireless connection from the computing device to the microphone device. The speaker device plays the receive audio stream on a speaker of the speaker device.

In general, in one aspect, one or more embodiments relate to a system for distributed microphone in a wireless audio system. The system includes a microphone device and a speaker device. The microphone device generates a transmit audio stream via at least one microphone on the microphone device. The microphone device transmits the transmit audio stream to the computing device via a first wireless connection and ignores a receive audio stream received from the computing device via the first wireless connection. The speaker device obtains a set of connection parameters for the first wireless connection between the microphone device and the computing device, intercepts the receive audio stream transmitted using the first wireless connection from the computing device to the microphone device, and plays the receive audio stream on a speaker of the speaker device.

Other aspects of the invention will be apparent from the following description and the appended claims.

DETAILED DESCRIPTION

In general, embodiments of the invention are directed to a distributed microphone in a wireless audio system. The wireless audio system includes a microphone device and one or more speaker devices. The microphone device establishes a single wireless bidirectional connection with a computing device. The microphone device shares the connection parameters with the speaker devices. The speaker devices use the connection parameters to intercept audio signals transmitted via the connection. Thus, speaker devices may be separate from the microphone device while still appearing as a single device to the computing device.

In some embodiments, rather than the microphone device establishing the connection with the computing device, a speaker device establishes the single wireless connection with the computing device to obtain connection parameters. The single wireless connection is then transferred to the microphone device, such that the microphone device becomes the primary device in order to send transmit audio. The speaker device may still use the connection to intercept receive audio.

Figure 1:
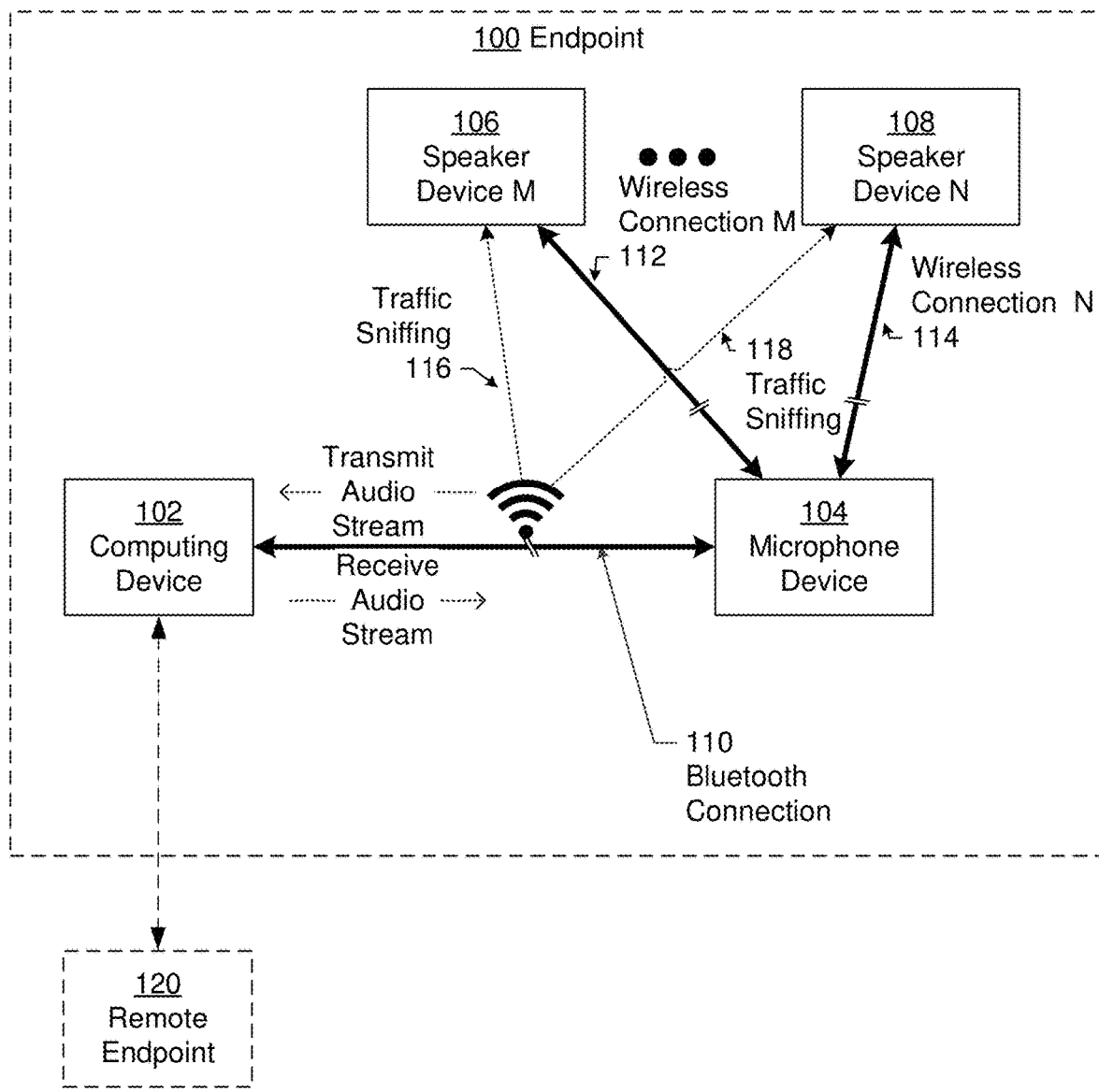
FIG. 1 shows a diagram of an endpoint in accordance with one or more embodiments.

An endpoint (100) that includes a distributed microphone device is shown in FIG. 1 and described below. As shown in FIG. 1, the endpoint (100) includes a computing device (102), microphone device (104), speaker device M (106), and speaker device N (108).

The computing device (102) is a physical hardware device that is a local source of a receive audio stream (i.e., audio stream played for a local user) and a local sink of transmit audio stream (i.e., audio stream received from a local user, such as for transmission on a network). The computing device (102) may be a mobile phone, wearable device, tablet, computer system, desktop telephone, dictation device, smart home devices, conferencing device, or other such device. The actual source of the receive audio stream may be an endpoint (e.g., remote endpoint (120), shown as optional in FIG. 1) from a network or local storage. Similarly, the actual sink may be an endpoint (e.g., remote endpoint (120)) connected via the network or local storage.

The microphone device (104) is a standalone physical hardware device that has one or more microphones and Bluetooth® port. For example, the microphone device (104) may be any form factor including handheld microphone device, clip-on microphone device, a desktop microphone device, a cradle or case, or another form factor.

Figure 2:
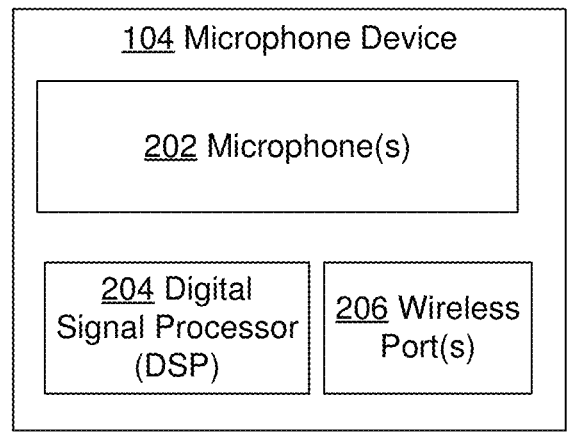
FIG. 2 shows a diagram of a microphone device in accordance with one or more embodiments.

FIG. 2 shows a diagram of a microphone device (104) in accordance with one or more embodiments. As shown in FIG. 2, the microphone device (104) includes one or more microphone(s) (202) configured to obtain acoustic signals (i.e., sound) and convert the acoustic signals into audio signals, such as digital or analog audio signal. The acoustic signals include unwanted signals (e.g., environmental noise) and wanted signals (e.g., a user's voice) in varying proportions.

The collection of audio signals received over time is an audio stream. Because the audio signals are received locally and transmitted to the computing device, the resulting audio stream is a transmit audio stream. The microphone device (104) also includes a digital signal processor (DSP) (204) and one or more wireless ports (206). The DSP (204) is a microprocessor configured to process audio signals. For example, the DSP (204) may be configured to perform transmit side noise cancellation. Transmit side noise cancellation is the process of removing noise from a transmit audio signal before being transmitted. Thus, remote endpoints do not receive noises from the local user's environment.

Transmit noise cancellation may be performed using multiple microphones (202) on the microphone device (104). Specifically, increasing spacing between the multiple microphones increases the phase and amplitude differences between acoustic signals from the same acoustic source. The phase and amplitude differences may be used by acoustic source identification algorithms and beamforming algorithms to amplify (apply a gain) to acoustic signals from a particular source, e.g., the local user. By having a separate microphone device, constraints on amount of spacing between microphones (202) is not as much as for an integrated headset.

The microphone device (104) also includes one or more wireless ports (206). For example, the wireless ports (206) may include a Bluetooth® port, near field communication (NFC) port, or other wireless communication method. The microphone device (104) may include another type of wireless port without departing from the scope of the claims.

As shown in FIG. 2, the microphone device (104) omits a functional speaker that plays a receive audio stream. Rather, the microphone device (104) is configured to ignore (i.e., drop) the receive audio stream. Other embodiments could relay or broadcast the receive audio stream to another device through a wired or wireless port.

Returning to FIG. 1, the endpoint (110) also includes one or more speaker devices (e.g., speaker device M (106), speaker device N (108)). The speaker devices are discrete physically separate devices, in a separate housing from the microphone device, configured to play audio. For example, the speaker devices (e.g., speaker device M (106), speaker device N (108)) may be earbuds, headphones, room speakers, or other audio output device. For example, speaker device M (106) may be a left earbud and speaker device N (108) may be a right earbud. As another example, speaker device M (106) may be a room speaker and speaker device N (108) may be a different room speaker. Any number of speaker devices may exist. Further, the speaker devices may be combined into a same product (e.g., as a set of earbuds).

Figure 3:
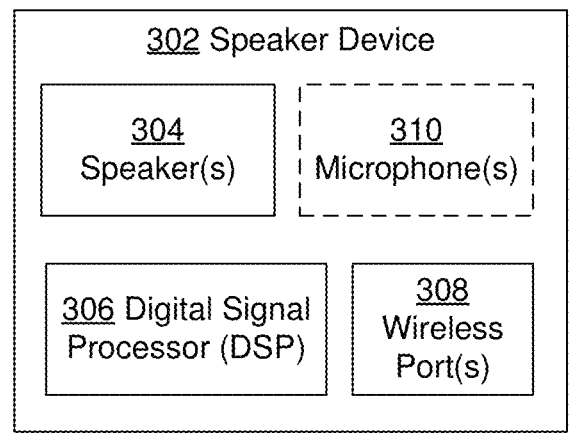
FIG. 3 shows a diagram of a speaker device in accordance with one or more embodiments.

FIG. 3 shows a diagram of a speaker device (302), such as the speaker devices of FIG. 1, in accordance with one or more embodiments. As shown in FIG. 3, the speaker device (302) may include speaker(s) (304), a DSP (306), and one or more wireless ports (308). The speaker(s) (304) are physical hardware that convert audio signals to acoustic signals to play for a local user. The DSP (306) is an embedded microprocessor for processing audio signals. For example, the DSP shall decode audio signals received via the wireless port(s). The DSP may be configured to encode audio signals. As another example, the DSP (306) may include functionality to perform receive noise cancellation (i.e., receive side noise cancellation or active noise cancellation (ANC)). Receive noise cancellation is the process by which the receive audio stream is adjusted to accommodate for background noise in a local user's environment so that the local user may clearly hear the audio being played without hearing the audio noise in the user's own environment. The receive noise cancellation uses local acoustic signals from one or more optional microphones (310) on the speaker device (302). Because, generally, a separate microphone device is used, the optional microphones on the speaker device are lightweight microphones. For example, the number of microphones may be reduced (e.g., to a single microphone). As another example, the type and, correspondingly, power consumption of the microphones may be reduced. The microphones (310) are configured to convert acoustic signals into the local audio signals. The DSP (306) may further include functionality to combine the receive audio stream with the transmit audio stream or a local audio stream to play a sidetone (i.e., the audible feedback a user naturally hears when speaking).

Returning to FIG. 1, the various devices of the endpoint (100) are configured to be physically separate and distinct devices when in operation. For example, the computing device, microphone device (104), and speaker devices (e.g., speaker device M (106), speaker device N (108)) each have individual housing that is configured to be separate when in use. In some embodiments, the various devices of FIG. 1 additionally may be configured to communicate using wired mechanisms or may have housing that is configured to connect. For example, the microphone device may include a holder or connector for the speaker devices when not in use. The microphone device may include multiple sub-devices, each with separate and individual housing. For example, the microphone device may be a charging case that holds a detachable microphone and the speaker devices.

To manage the physically separate and distinct operations when in use, connections within the local environment may be performed using wireless communication channels. The computing device (102) is configured to establish a Bluetooth® connection (110) with the microphone device (104). The computing device (102) may further be configured to establish a connection with the speaker devices, whereby the connection is transferred. The Bluetooth® connection (110) between the microphone device (104) and computing device (102) is bidirectional. Namely, even though the microphone device (104) ignores the receive audio stream, the computing device (102) still sends the receive audio stream via the Bluetooth® connection (110). Although Bluetooth® connection (110) is described, another radio wave-based connection may be used. To the computing device (102), the microphone device (104) appears as the only device of the endpoint (100) for connection via the Bluetooth® connection (110). Namely, even when receiving and playing the receive audio stream, the speaker devices (e.g., speaker device M (106), speaker device N (108)) are each hidden from the computing device (102). Specifically, to the computing device, the computing device is connected to a generic Bluetooth® headset. In the present application, the generic Bluetooth® headset includes the separate speaker devices and the microphone device, together all these devices work in concert to communicate with the computing device as if it were one device and so transparent to the computing device. In the preferred embodiment, the microphone radio uses the Bluetooth® headset identity.

The speaker devices (e.g., speaker device M (106), speaker device N (108)) are configured to establish a wireless connection (e.g., wireless connection M (112), wireless connection N (114)) with the microphone device (104). The wireless connection (e.g., wireless connection M (112), wireless connection N (114)) may be a Bluetooth® connection or other radio wave-based connection. The speaker devices (e.g., speaker device M (106), speaker device N (108)) are configured to intercept the Bluetooth® connection (110) between the microphone device (104) and the computing device (102). Intercepting may be performed via traffic sniffing (e.g., traffic sniffing (116), traffic sniffing (118)) of the Bluetooth® signals transmitted by the computing device (102) and the microphone device (104). Specifically, the speaker device performs traffic sniffing by listening for and processing the Bluetooth® signals even though the speaker device is not set as an endpoint of the Bluetooth® connection (110).

On a wireless audio device, processing and transmitting audio streams is relatively computationally expensive and power intensive. By separating the microphone device (104) from the speaker devices, the speaker devices may be lightweight devices with smaller form factor. For example, the battery size may be reduced. Likewise, the processing resources can be reduced as audio is not transmitted. Thus, for example, one or more embodiments may be used to simplify the DSP processor and any microphones, and reduce the battery size, on the speaker devices. For example, if the speaker devices are earbuds, embodiments may be used to minimize the size of the earbuds and create low profile earbuds.

Figure 4:
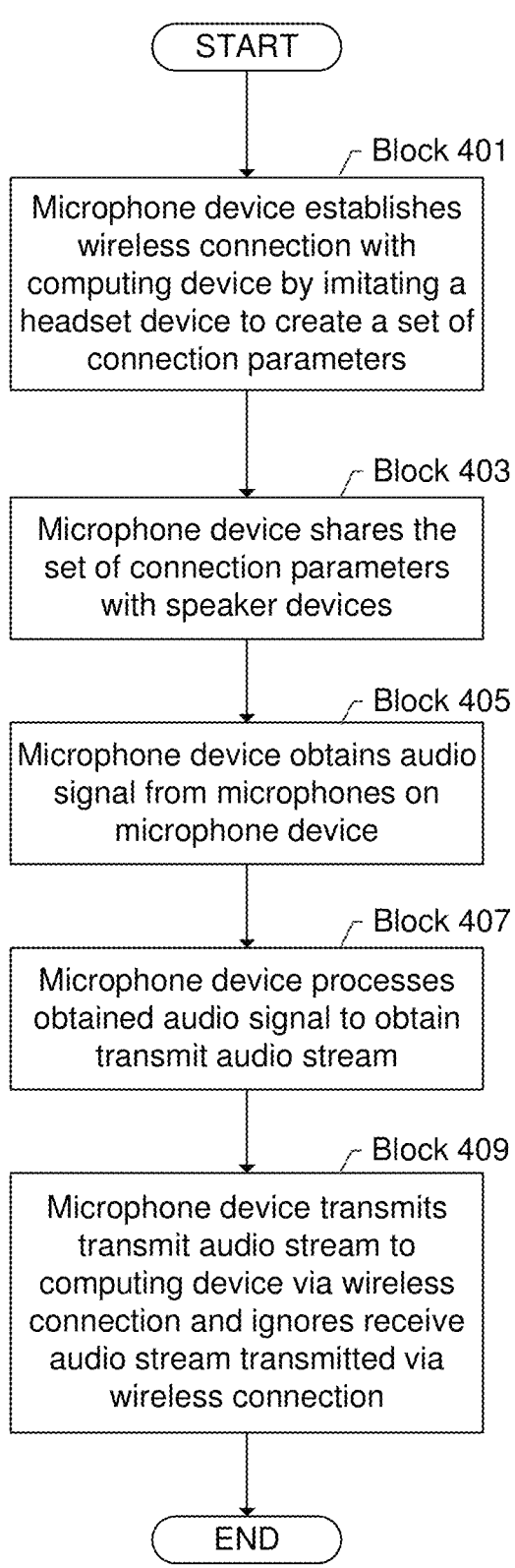
FIG. 4 shows a flowchart for execution by a microphone device in accordance with one or more embodiments.

FIG. 4 shows a flowchart for execution by a microphone device in accordance with one or more embodiments. In Block 401, the microphone device establishes a wireless connection with the computing device by imitating a headset device to create a set of connection parameters. During the pairing process between the microphone device and the computing device, the microphone device identifies itself as a headset device. Thus, even though the microphone device is only an input device, the microphone device sends the identification of a headset device type. Further, security information for securing communications between the microphone device and the computing device are exchanged. The operation of Block 401 may be multiple operations separated in time. For example, the pairing process to exchange pairing information may be separate in time from a later connection process. As part of the connection between the microphone device and the computing device, a set of connection parameters are defined. The connection parameters may include, for example, Bluetooth® address of the computing device, Bluetooth® link key between Microphone and Computing device, Channel information like adaptive frequency hopping (AFH) map, Codec information between Microphone and Computing device, etc. The connection parameters will allow either a Basic Rate/Enhanced Data Rate (BREDR) or Bluetooth® Low Energy (BLE) connection to be established between the computing device and microphone.

In Block 403, the microphone device shares the set of connection parameters with the speaker devices. The microphone device establishes a separate wireless connection with one or more speaker devices. The separate wireless connection may be with each speaker device or in a chain from one speaker device to the next speaker device. After establishing the wireless connection with the speaker device, the microphone device shares, with the speakers and via the wireless connection, the set of connection parameters for the connection between the microphone device and the computing device. Because of the shared connection parameters, the speaker devices shall be able to sniff any connection established between the microphone and computing device.

In Block 405, the microphone device obtains audio signal via the microphones on the microphone device. The microphones convert acoustic signals into audio signals. The microphones pass the audio signals to the DSP on the microphone.

In Block 407, the microphone device processes the obtained audio signal to generate a transmit audio stream. The processing of the transmit audio stream may be to receive audio signals from multiple microphones on the microphone device. Beamforming may be performed to isolate the user's voice from surrounding environmental noise. Further, the transmit audio stream is encoded for transmission via the wireless connection, in one or more embodiments.

In Block 409, the microphone device transmits the transmit audio stream to the computing device via wireless connection and ignores (e.g., does not process) any receive audio stream transmitted via the wireless connection. The microphone device drops the receive audio stream. Ignoring the receive audio stream may be to simply acknowledge the packets in the receive audio stream or to not have circuitry to receive and process the receive audio stream.

Blocks 405-409 may be repetitively performed through the communication session.

Figure 5:
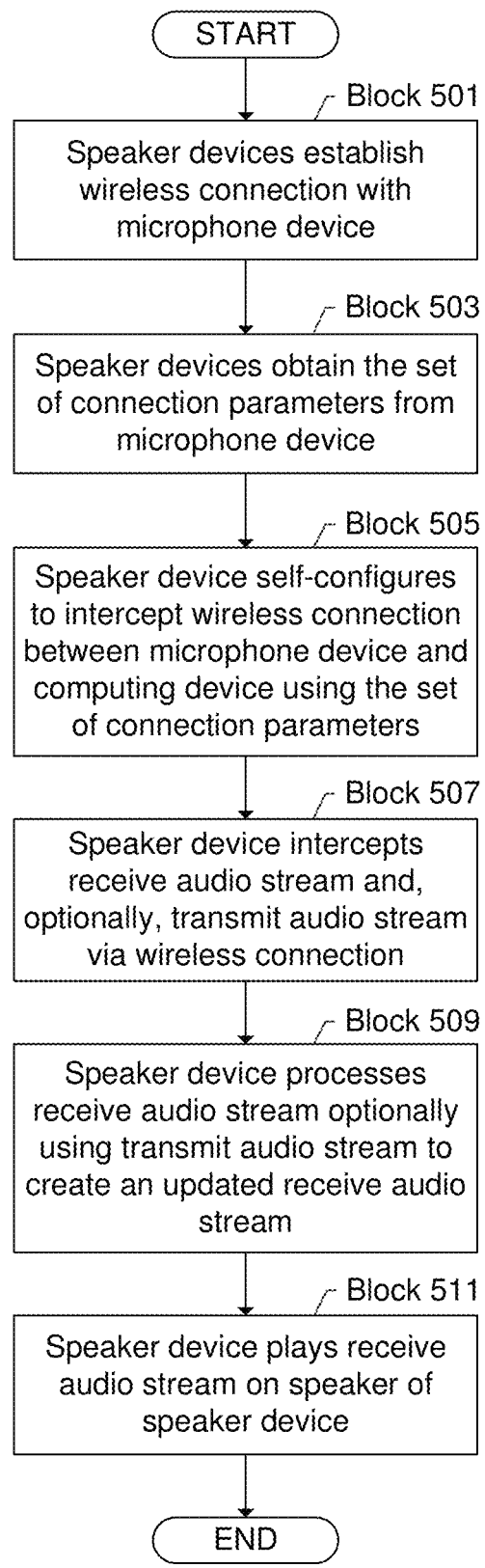
FIG. 5 shows a flowchart for execution by a speaker device in accordance with one or more embodiments.

FIG. 5 shows a flowchart for execution by a speaker device in accordance with one or more embodiments. In Block 501, the speaker devices establish a wireless connection with the microphone device. The speaker devices are paired with the microphone device and establish the wireless connection with the microphone device. The speaker devices further obtain the set of connection parameters from the microphone device in Block 503.

Obtaining the connection parameters may be performed by receiving the connection parameters via the wireless connection with the microphone device. As another example, obtaining the connection parameters may be performed by the speaker device establishing the first wireless connection with the computing device to create the set of connection parameters. The speaker device establishing the connection with the computing device may be performed in a same or similar way discussed above with respect to the microphone device establishing connection. After the speaker device establishes the first wireless connection, the first wireless connection may be transferred to be between the computing device and the microphone device. For example, the speaker device that established the first wireless connection may share the connection parameters with the microphone device and any other speaker devices. The microphone device may then take over the first wireless connection as a primary device.

Continuing with FIG. 5, using the set of connection parameters, the speaker device self-configures to intercept the wireless connection between the microphone device and computing device in Block 505. For example, the self-configuration may be to set the settings for receiving the Bluetooth® signal on the Bluetooth® link, and to set the keys for decrypting the receive and transmit audio signals.

In Block 507, the speaker device intercepts the receive audio stream and, optionally, the transmit audio stream via a wireless connection. The speaker device receives the audio streams as if the speaker device were the intended target.

In Block 509, the speaker device processes the receive audio stream, optionally using the transmit audio stream, to create an updated receive audio stream. The speaker device may decode the receive audio stream received via the wireless connection. Further, the speaker device may perform receive noise cancellation (i.e., receive-side noise cancellation) using a local audio stream from a local microphone. The receive noise cancellation removes a noise component attributable to a local environment. The speaker device may optionally use the transmit audio stream or local audio stream to add sidetone to the receive audio stream.

In Block 511, the speaker device plays the receive audio stream on the speaker of the speaker device. Playing the receive audio stream in Block 511 may correspond to playing the updated receive audio stream. The speaker converts the audio signals of the receive audio stream to acoustic signals. Using the operations of FIG. 4 and FIG. 5, the speaker devices and microphone device appears as a single device even though the microphone device is distributed from the speaker device. The speaker devices and the microphone device are configured and operate wireless ports so the computing device communicates with the respective devices just as if it was a single headset device.

Figure 6:
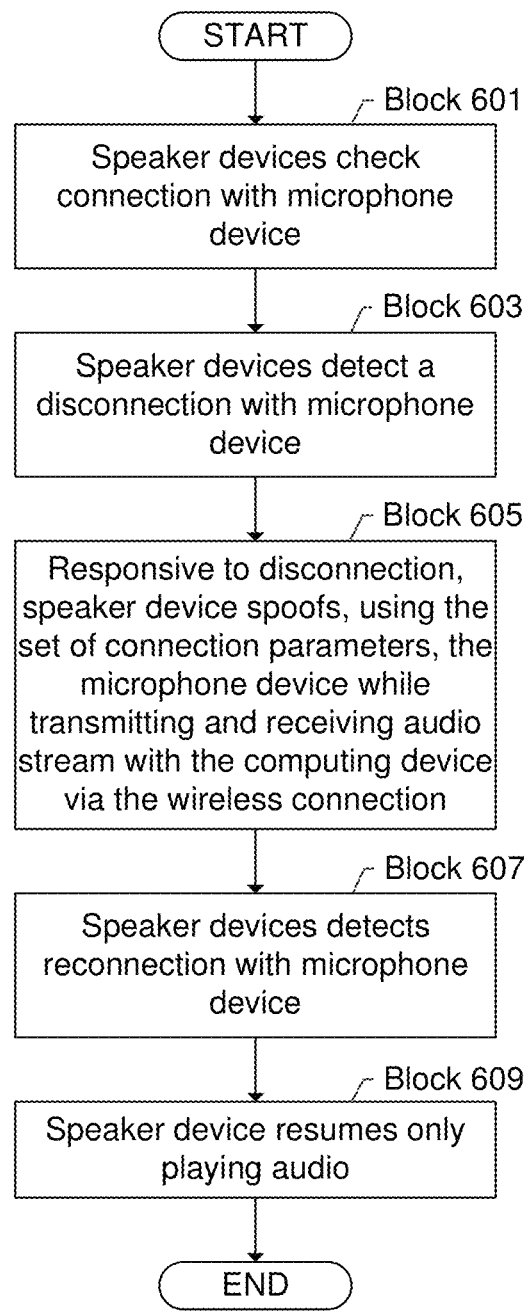
FIG. 6 shows a flowchart for failover in accordance with one or more embodiments.

One or more embodiments may also be configured for a case of failover. During failover, one of the speaker devices may take over from the microphone device. FIG. 6 shows a flowchart for failover in accordance with one or more embodiments. In Block 601, the speaker devices check for a connection with the microphone device. The speaker device may periodically check for failure. The speaker device may monitor link drop between the microphone device and the computing device. The speaker device may scan the Bluetooth® Low Energy advertising data from the microphone device to detect an unintentional microphone device power off. For example, the periodic heartbeat signals may be transmitted via the wireless connection between the speaker device and the microphone device. In Block 603, the speaker device detects a disconnection with the microphone device.

Based on the disconnection, the speaker device determines that the microphone device is disconnected from the computing device. In Block 605, responsive to the disconnection, the speaker device spoofs, using the set of connection parameters, the microphone device while transmitting and receiving audio stream with the computing device via the wireless connection. The speaker device takes over the wireless connection between the computing device and the microphone device. The speaker device may use the microphones of the speaker device to obtain a transmit audio stream. The speaker device may transmit the transmit audio stream to the computing device. While the audio quality of the microphones on the speaker device is less than the audio quality of the microphones, the existence of the failover is hidden from the computing device. Namely, to the computing device, the microphone device loss of connection is hidden.

In Block 607, the speaker device detects a reconnection with the microphone device. Based on the reconnection, the speaker device resumes only playing audio in Block 609. Thus, the speaker device stops transmitting a locally acquired transmit audio stream.

Figure 7:
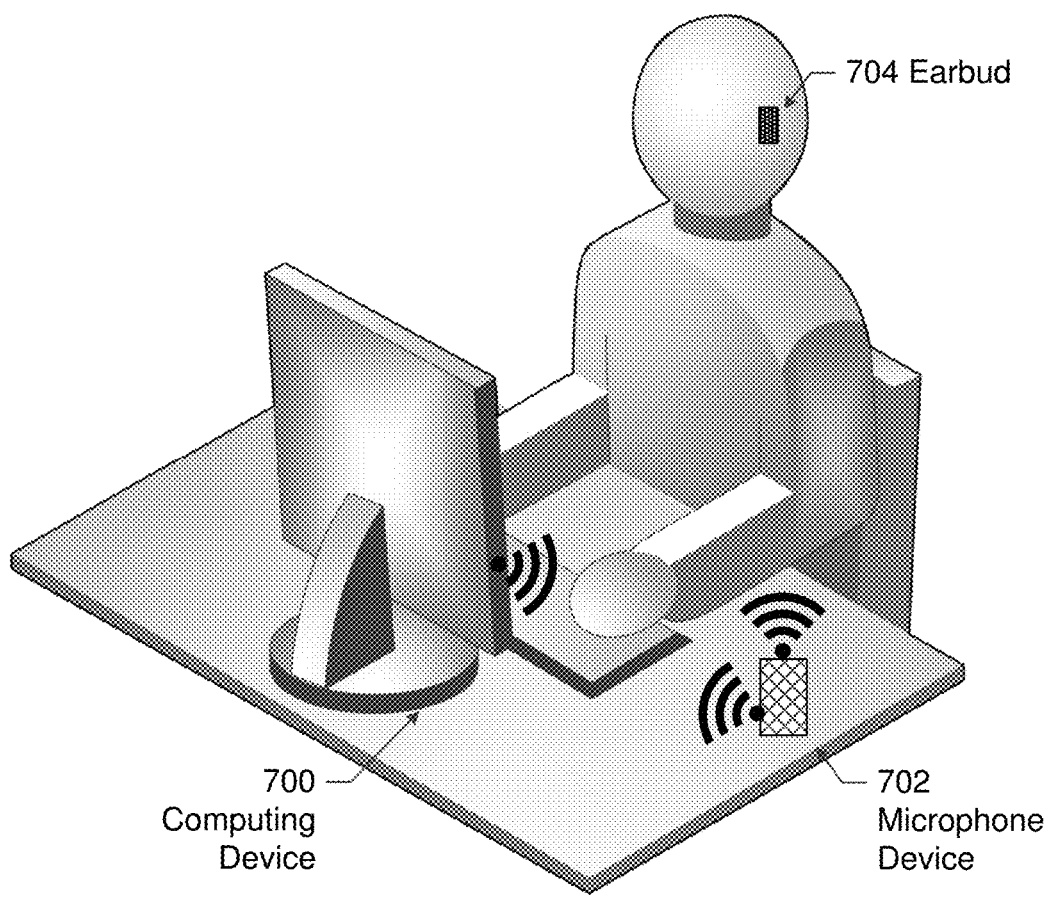
FIG. 7 shows an example in accordance with one or more embodiments.

FIG. 7 shows an example user configuration in accordance with one or more embodiments. A user works using their computing device (700), a personal computer. The computing device (700) connects to a microphone device (702), which is in a separate housing on the user's desk. The user also has earbuds (704). Because the microphone device (702) is separate from the earbuds (704), the number and quality of the microphones in the microphone device (702) may be greater than the earbuds. Further, because of the larger form factor, more separation may exist between the microphones within the microphone device (702) providing better beamforming.

The use of earbuds (704) allows the user listen without distraction of background noise. Further, without having the functionality to generate and transmit the transmit audio stream, the earbuds (704) may have fewer microphones and a smaller battery. Thus, the earbuds may be more lightweight than prior earbuds. To the computing device (700) the earbuds and the microphone device appear as a single device. The computing device (700) may simply transmit and receive audio on the same Bluetooth® connection. If the microphone device fails or the user is away from the microphone device, the earbuds are configured to take over the same connection. Thus, while the audio quality on the user's side may be reduced, conference calls proceed uninterrupted.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, the term "or" in the description is intended to be inclusive or exclusive. For example, "or" between multiple items in a list may be one or more of each item, only one of a single item, each item, or any combination of items in the list.

In the above detailed description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    establishing, by a microphone device imitating a headset device, a first wireless connection with a computing device to create a set of connection parameters;
    sharing, by the microphone device, the set of connection parameters with a speaker device via a second wireless connection;
    generating, by the microphone device, a transmit audio stream via at least one microphone on the microphone device; and
    transmitting, by the microphone device, the transmit audio stream to the computing device via the first wireless connection and ignoring a receive audio stream received from the computing device via the first wireless connection.

2. The method of claim 1, further comprising:
establishing, by the speaker device, the second wireless connection with the microphone device;
obtaining, by the speaker device via the second wireless connection, the set of connection parameters from the microphone device;
intercepting, by the speaker device using the set of connection parameters, the receive audio stream transmitted using the first wireless connection from the computing device to the microphone device; and
playing, by the speaker device, the receive audio stream on a speaker of the speaker device.

3. The method of claim 2, further comprising:
detecting a disconnection of the second wireless connection with the microphone device; and
responsive to the disconnection, spoofing, using the set of connection parameters, the microphone device while transmitting and receiving audio stream with the computing device via the first wireless connection-.

4. The method of claim 2, further comprising:
intercepting, by the speaker device, a transmit audio stream transmitted using the first wireless connection from the microphone device to the computing device; and
processing the receive audio stream using the transmit audio stream to create an updated receive audio stream,
wherein the playing the receive audio stream comprises playing the updated receive audio stream.

5. The method of claim 2, further comprising:
receiving, via a microphone on the speaker device, a local audio stream comprising a noise component;
determining, by the speaker device, the noise component in the local audio stream; and
performing, using the noise component and by the speaker device, noise cancellation when playing the receive audio stream.

6. The method of claim 1, further comprising:
performing, by the microphone device, a transmit side noise cancellation of the transmit audio stream prior to transmitting the transmit audio stream to the computing device.

7. A method comprising:
obtaining, by a speaker device, a set of connection parameters for a first wireless connection between a microphone device and a computing device;
intercepting, by the speaker device using the set of connection parameters, a receive audio stream transmitted using the first wireless connection from the computing device to the microphone device;
ignoring, by the microphone device, the receive audio stream; and
playing, by the speaker device, the receive audio stream on a speaker of the speaker device.

8. The method of claim 7, further comprising:
establishing, by the speaker device, a second wireless connection (112, 114) with the microphone device,
wherein the set of connection parameters are obtained via the second wireless connection (112, 114).

9. The method of claim 8, further comprising:
detecting a disconnection of the second wireless connection with the microphone device; and
responsive to the disconnection, spoofing, using the set of connection parameters, the microphone device while transmitting and receiving audio stream with the computing device via the first wireless connection.

10. The method of claim 9, further comprising:
detecting a reconnection of the second wireless connection with the microphone device; and
responsive to the reconnection, resuming only playing the receive audio stream.

11. The method of claim 7, wherein obtaining the set of connection parameters comprises:
establishing, by the speaker device, the first wireless connection with the computing device to create the set of connection parameters,
wherein the first wireless connection is transferred to be between the microphone device and the computing device.

12. The method of claim 7, further comprising:
intercepting, by the speaker device, a transmit audio stream transmitted using the first wireless connection from the microphone device to the computing device; and
processing the receive audio stream using the transmit audio stream to create an updated receive audio stream,
wherein the playing the receive audio stream comprises playing the updated receive audio stream.

13. The method of claim 7, further comprising:
receiving, via a microphone on the speaker device, a local audio stream comprising a noise component;
determining the noise component in the local audio stream; and
performing, using the noise component, noise cancellation when playing the receive audio stream.

14. A system comprising:
a microphone device configured to:
generate a transmit audio stream via at least one microphone on the microphone device, and
transmit the transmit audio stream to a computing device via a first wireless connection and ignore a receive audio stream received from the computing device via the first wireless connection; and
a speaker device configured to:
obtain a set of connection parameters for the first wireless connection between the microphone device and the computing device,
intercept the receive audio stream transmitted using the first wireless connection from the computing device to the microphone device, and
play the receive audio stream on a speaker of the speaker device.

15. The system of claim 14, wherein the speaker device comprises:
a wireless port to intercept a transmit audio stream transmitted using the first wireless connection from the microphone device to the computing device; and
a digital signal processor to process the receive audio stream using the transmit audio stream to create an updated receive audio stream,
wherein playing the receive audio stream comprises playing the updated receive audio stream.

16. The system of claim 14, wherein the speaker device comprises:
a microphone to receive a local audio stream comprising a noise component; and
a digital signal processor to:
determine the noise component in the local audio stream, and
perform, using the noise component, noise cancellation when playing the receive audio stream.

17. The system of claim 14, wherein the microphone device comprises:
- a digital signal processor to perform a transmit side noise cancellation of the transmit audio stream prior to transmitting the transmit audio stream to the computing device.

18. The system of claim 14, wherein the speaker device is an earbud.

19. The system of claim 18, wherein the microphone device is a charging case for the earbud.

20. The system of claim 14, wherein the speaker device is a room speaker.

\* \* \* \* \*